(12) United States Patent
Burts, Jr.

(10) Patent No.: US 6,716,798 B1
(45) Date of Patent: *Apr. 6, 2004

(54) CONFORMANCE IMPROVEMENT ADDITIVE, CONFORMANCE TREATMENT FLUID MADE THEREFROM, METHOD OF IMPROVING CONFORMANCE IN A SUBTERRANEAN FORMATION

(76) Inventor: Boyce D. Burts, Jr., P.O. Box 82007, Lafayette, LA (US) 70598-2007

( * ) Notice: Subject to any disclaimer, the term of this patent is extended or adjusted under 35 U.S.C. 154(b) by 0 days.

This patent is subject to a terminal disclaimer.

(21) Appl. No.: 09/296,216

(22) Filed: Apr. 22, 1999

Related U.S. Application Data

(62) Division of application No. 08/962,214, filed on Oct. 31, 1997, now Pat. No. 6,102,121.

(51) Int. Cl.$^7$ .................................................. C09K 7/02
(52) U.S. Cl. ........................ 507/104; 507/204; 507/903; 507/904
(58) Field of Search ............................... 507/229, 209, 507/104, 204; 166/250, 295

(56) References Cited

U.S. PATENT DOCUMENTS

| | | | |
|---|---|---|---|
| 2,610,149 A | 9/1952 | VanDyke | 252/8.5 |
| 2,708,973 A | 5/1955 | Twining | 166/22 |
| 2,779,417 A | 1/1957 | Clark et al. | 166/31 |
| 3,208,524 A * | 9/1965 | Horner et al. | 166/32 |
| 3,374,834 A | 3/1968 | Ramos et al. | 166/33 |
| 3,408,296 A | 10/1968 | Kuhn et al. | 166/283 X |
| 3,462,958 A | 8/1969 | Patin et al. | 61/1 |
| 3,701,384 A | 10/1972 | Routson et al. | 166/292 |
| 3,766,984 A | 10/1973 | Nimerick | 166/295 X |
| 3,845,822 A | 11/1974 | Clampitt et al. | 166/281 |
| 3,981,363 A | 9/1976 | Gall | 166/270 |
| 4,018,286 A | 4/1977 | Gall et al. | 166/295 |
| 4,039,029 A | 8/1977 | Gall | 166/294 |
| 4,183,406 A | 1/1980 | Lundberg et al. | 166/295 |
| 4,247,403 A | 1/1981 | Foley et al. | 252/8.5 |
| 4,391,925 A | 7/1983 | Mintz et al. | 523/13 |
| 4,474,665 A | 10/1984 | Green | 252/8.5 |
| 4,566,979 A * | 1/1986 | Githens | 507/209 |
| 4,579,668 A | 4/1986 | Messenger | 252/8.5 |
| 4,683,949 A | 8/1987 | Sydansk et al. | 166/270 |
| 4,722,397 A | 2/1988 | Sydansk et al. | 166/295 |
| 4,723,605 A | 2/1988 | Sydansk | 166/295 |
| 4,730,674 A | 3/1988 | Burdge et al. | 166/295 |
| 4,730,675 A | 3/1988 | Wygant et al. | 166/295 |
| 4,744,418 A | 5/1988 | Sydansk | 166/295 |
| 4,744,419 A | 5/1988 | Sydansk et al. | 166/270 |
| 4,770,245 A | 9/1988 | Sydansk | 166/295 |
| 4,779,680 A | 10/1988 | Sydansk | 166/300 |
| 4,844,168 A | 7/1989 | Sydansk | 166/270 |
| 4,947,935 A | 8/1990 | Sydansk | 166/295 |
| 4,957,166 A | 9/1990 | Sydansk | 166/295 |
| 4,989,673 A * | 2/1991 | Sydansk | 166/250 |
| 4,995,461 A | 2/1991 | Sydansk | 166/295 |
| 5,004,553 A * | 4/1991 | House et al. | 507/229 |
| 5,065,820 A | 11/1991 | Bloys et al. | 166/291 |
| 5,071,575 A | 12/1991 | House et al. | 507/104 |
| 5,076,944 A | 12/1991 | Cowan et al. | 507/104 |
| 5,118,664 A | 6/1992 | Burts, Jr. | 507/104 |
| 5,229,018 A | 7/1993 | Forrest | 507/209 |
| 5,246,602 A | 9/1993 | Forrest | 166/283 |
| 5,377,760 A * | 1/1995 | Merrill | 166/295 |
| 5,415,229 A | 5/1995 | Sydansk | 166/295 |
| 5,421,411 A | 6/1995 | Sydansk | 166/295 |
| 5,478,802 A | 12/1995 | Moradi-Araghi | 507/203 |
| 5,501,275 A | 3/1996 | Card et al. | 166/280 |
| 5,599,776 A | 2/1997 | Burts, Jr. | 507/104 |

* cited by examiner

*Primary Examiner*—Jill Warden
*Assistant Examiner*—LaToya Cross
(74) *Attorney, Agent, or Firm*—Gilbreth & Associates, P.C.; J. M. (Mark) Gilbreth; Mary A. Gilbreth

(57) ABSTRACT

For conformance treatment to plug an opening in subterranean hydrocarbon bearing formation, a conformance additive including a dry mixture of water soluble crosslinkable polymer, a crosslinking agent, and a reinforcing material of fibers and/or comminuted plant materials. The method of forming a conformance fluid includes contacting the additive with water or an aqueous solution, with a method of conforming the formation further including the step of injecting the fluid into the formation to plug the opening.

13 Claims, No Drawings

CONFORMANCE IMPROVEMENT ADDITIVE, CONFORMANCE TREATMENT FLUID MADE THEREFROM, METHOD OF IMPROVING CONFORMANCE IN A SUBTERRANEAN FORMATION

RELATED APPLICATION DATA

This application is a Divisional application of U.S. patent application Ser. No. 08/962,214, filed Oct. 31, 1997, now abandoned.

BACKGROUND OF THE INVENTION

1. Field of the Invention

The present invention relates to conformance additives, to conformance treatment fluids made therefrom, to methods of improving conformance in a well. In another aspect, the present invention relates to conformance additives comprising polymer and fibers, to conformance treatment fluids made therefrom, to methods of improving conformance in a well using such fluids.

2. Description of the Related Art

In the production of hydrocarbons from subterranean hydrocarbon bearing formations, poor vertical conformance results from the vertical juxtaposition of relatively high permeability geologic zones to relatively low permeability zones within the subterranean formation. Poor areal conformance results from the presence of high permeability streaks and high permeability anomalies within the formation matrix, such as vertical fractures and networks of the same, which have very high permeability relative to the formation matrix. Fluids generally exhibit poor flow profiles and sweep efficiencies in subterranean formations having poor vertical or areal conformance. Poor conformance is particularly a problem where vertical heterogeneity and/or fracture networks or other structural anomalies are in fluid communication with a subterranean wellbore across which fluids are injected or produced.

The prior art is replete with a number of attempts to remedy conformance problems. For example, U.S. Pat. Nos. 3,762,476; 3,981,363; 4,018,286; and 4,039,029 to Gall or Gall et al describe various processes wherein gel compositions are formed in high permeability zones of subterranean formations to reduce the permeability therein. According to U.S. Pat. No. 3,762,476, a polymer such as polyacrylamide is injected into a formation followed sequentially by a crosslinking agent. The sequentially injected slugs are believed to permeate the treatment zone of the formation and gel in situ.

U.S. Pat. Nos. 4,683,949 and 4,744,419 both to Sydansk et al., both note that it is generally held that effective polymer/crosslinking agent systems necessitate sequential injection of the gel components because gel systems mixed on the surface often set up before they can effectively penetrate the treatment region. Both Sydansk et al. patents further note that in practice, treatments such as that disclosed in U.S. Pat. No. 3,762,476 using sequentially injected gel systems have proven unsatisfactory because of the inability to achieve complete mixing and gelation in the formation. As a result, gels only form at the interface of the unmixed gel components and often in regions remote from the desired treatment region.

Both of the Sydansk et al. patents purport to overcome a then-existing need in the art for a gelation process capable of forming gels having a predetermined gelation rate, strength, and stability to satisfy the particular demands of a desired treatment region in a subterranean hydrocarbon-bearing formation, through the use of a high molecular weight water-soluble acrylamide polymer, a chromium III/carboxylate complex cross-linking agent.

U.S. Pat. No. 5,377,760 to Merrill notes that while the polymer system of Sydansk et al. '949 was an improvement over prior art systems which required sequential injection of the polymer components, difficulty was still encountered in employing the '949 polymer system to plug large fissures because the larger masses of polymer required often lack the necessary strength to resist the pressures to which they are exposed. Merrill proposes the incorporation of fibers in the polymer by mixing the fibers with the polymer solution at the surface.

U.S. Pat. No. 3,701,384 discloses a method of sealing thief zones in a subterranean formation by plugging pores with a solid material. A slurry of finely divided inorganic solids is injected into the formation together with an aqueous colloidal dispersion of a water-insoluble metal hydroxide in a dilute aqueous solution of a high-molecular-weight organic polymeric polyelectrolyte. The preferred polymer solution contains between about 0.01 and about 0.2 percent by weight of high molecular weight polyacrylamide or hydrolyzed polyacrylamide. At these concentrations, the dissolved polymer causes the suspended solids to flocculate, thereby blocking pores in the formation. The tested inorganic solids which interacted with the polymer solution to form strong solids included finely ground asbestos fibers and magnesium oxide. However, asbestos is undesirable for use today, due to its carcinogenicity.

Another approach taken by the prior art is to pump a slurry containing a mixture of flexible fibers and a bonding agent into highly permeable portions of a formation interval. An agent which precipitates or gels the bonding agent is then injected into the interval. The goal of the method is to build up a filter cake of fibers on the permeable formation as a result of the fibers being deposited out of the slurry as the slurry flows through, the permeable formation, and then bond the fibers of the filter cake in place. Examples of such a method are disclosed in U.S. Pat. Nos. 3,593,798, 3,949, 811 and 3,462,958.

Larger fissures are bridged according to the disclosure of U.S. Pat. No. 2,708,973 by setting fibrous plants in place in the fissure, after which cement is added, thereby building on the framework of the plants. While such a method can bridge larger gaps, the process is impractical for use in deep formations that extend over a large area.

U.S. Pat. No. 3,374,834 discloses a method of stabilizing earth formations by injecting an aqueous solution of gelling material which contains finely divided inert solids and needle-like crystals of silicate materials which act as a suspending agent to prevent premature settling out of the solids. The resulting gel does not, however, provide the desired combination of strength, economy, ease of mixing and ability to be readily introduced into a formation.

However, in spite of the advancements in the prior art, there still need for further innovation in the conformance improvement arts.

Specifically, Merrill's teaching of mixing the fibers with the polymer solution requires a multiplicity of storage and mixing tanks, and a metering system which must be operated during the operation of the well. Specifically, a first tank will store a water and polymer solution, a second tank will store a water and cross-linking solution, and a third tank will be used to mix fibers with polymer solution from the first tank to create a polymer/fiber slurry. This polymer/fiber slurry is then metered from the third tank and combined with cross-linking solution metered from the second tank to the well bore.

Thus, there is a need for a conformance additive which would allow for simplification of the mixing equipment.

There is another need a conformation method allowing for a simplification of the mixing equipment.

These and other needs in the art will become apparent to those of skill in the art upon review of this specification, including its drawings and claims.

SUMMARY OF THE INVENTION

It is an object of the present invention to provide for further innovation in the conformance improvement arts.

It is another object of the present invention to provide for a conformance additive which will allow for the simplification of the mixing equipment.

It is even another object of the present invention to provide for a conformance method will allow for the simplification of the mixing equipment.

These and other objects of the present invention will become apparent to those of skill in the art upon review of this specification, including its drawings and claims.

According to one embodiment of the present invention there is provided a conformance additive comprising a dry mixture of water soluble crosslinkable polymer, a crosslinking agent, and a reinforcing material selected from among fibers and comminuted plant materials. In preferred embodiments, polymer is an a carboxylate-containing polymer and the crosslinking agent is a chromic carboxylate complex. In other preferred embodiments, the reinforcing material may comprise hydrophobic fibers selected from among nylon, rayon, and hydrocarbon fibers, and/or hydrophilic fibers selected from among glass, cellulose, carbon, silicon, graphite, calcined petroleum coke, and cotton fibers. The comminuted plant material is selected from the group of comminuted plant materials of nut and seed shells or hulls of almond, brazil, cocoa bean, coconut, cotton, flax, grass, linseed, maize, millet, oat, peach, peanut, rice, rye, soybean, sunflower, walnut, and wheat; rice tips; rice straw; rice bran; crude pectate pulp; peat moss fibers; flax; cotton; cotton linters; wool; sugar cane; paper; bagasse; bamboo; corn stalks; sawdust; wood; bark; straw; cork; dehydrated vegetable matter; whole ground corn cobs; corn cob light density pith core; corn cob ground woody ring portion; corn cob chaff portion; cotton seed stems; flax stems; wheat stems; sunflower seed stems; soybean stems; maize stems; rye grass stems; millet stems; and mixtures thereof.

According to another embodiment of the present invention, there is provided a method of forming a conformance fluid. The method generally includes taking the above conformance additive and contacting it with water or other aqueous solution.

According to even another embodiment of the present invention, there is provided a method of for plugging an opening in a subterranean formation. The method generally includes contacting the above described conformance additive with water or an aqueous solution to for a conformance fluid. The method then includes injecting the conformance fluid into the formation.

These and other embodiments of the present invention will become apparent to those of skill in the art upon review of this specification and claims.

DETAILED DESCRIPTION OF THE INVENTION

The conformance additive of the present invention includes polymer, cross-linking agent and either fibers or comminuted particles of plant materials. In a preferred embodiment of the present invention, the conformance additive is a dry mixture of polymer, cross-linking agent and either fibers or comminuted particles of plant materials.

Any suitable relative amounts of the polymer, cross-linking agent and either fibers or comminuted particles of plant materials may be utilized in the present invention provided that the desired conformance results are achieved. Generally, the fibers or comminuted particles will comprise in the range of about 1 to about 99 weight percent, preferably in the range of about 25 to about 90 weight percent, more preferably in the range of about 50 to about 80 weight percent, and even more preferably in the range of about 70 to about 75 weight percent, all based on the total with of the polymer, fibers and particles. A suitable amount of crosslinking agent is provided to reach the desired amount of crosslinking. Suitable amounts of dispersants, retarders, accelerants, and other additives may be provided as necessary or desired.

The polymer utilized in the practice of the present invention is preferably water soluble and must be capable of being pumped as a liquid and subsequently crosslinked in place to form a substantially non-flowing crosslinked polymer which has sufficient strength to withstand the pressures exerted on it. Moreover, it must have a network structure capable of incorporating reinforcing fibers.

While any suitable water soluble polymer may be utilized, the preferred polymer utilized in the practice of the present invention is a carboxylate-containing polymer. This preferred carboxylate-containing polymer may be any crosslinkable, high molecular weight, water-soluble, synthetic polymer or biopolymer containing one or more carboxylate species.

For an example of polymers and crosslinking agents suitable for use herein and details regarding their making and use, please see U.S. Pat. Nos. 4,683,949 and 4,744,419, both incorporated herein by reference.

The average molecular weight of the carboxylate-containing polymer utilized in the practice of the present invention is in the range of about 10,000 to about 50,000,000, preferably in the range of about 100,000 to about 20,000,000, and most preferably in the range of about 200,000 to about 15,000,000.

Biopolymers useful in the present invention include polysaccharides and modified polysaccharides. Non-limiting examples of biopolymers are xanthan gum, guar gum, carboxymethylcellulose, o-carboxychitosans, hydroxyethylcellulose, hydroxypropylcellulose, and modified starches. Non-limiting examples of useful synthetic polymers include acrylamide polymers, such as polyacrylamide, partially hydrolyzed polyacrylamide and terpolymers containing acrylamide, acrylate, and a third species. As defined herein, polyacrylamide (PA) is an acrylamide polymer having substantially less than 1% of the acrylamide groups in the form of carboxylate groups. Partially hydrolyzed polyacrylamide (PHPA) is an acrylamide polymer having at least 1%, but not 100%, of the acrylamide groups in the form of carboxylate groups. The acrylamide polymer may be prepared according to any conventional method known in the art, but preferably has the specific properties of acrylamide polymer prepared according to the method disclosed by U.S. Pat. No. Re. 32,114 to Argabright et al incorporated herein by reference.

Any crosslinking agent suitable for use with the selected polymer may be utilized in the practice of the present invention. Preferably, the crosslinking agent utilized in the present invention is a chromic carboxylate complex.

The term "complex" is defined herein as an ion or molecule containing two or more interassociated ionic, radical or molecular species. A complex ion as a whole has a distinct electrical charge while a complex molecule is electrically neutral. The term "chromic carboxylate complex" encompasses a single complex, mixtures of complexes containing the same carboxylate species, and mixtures of complexes containing differing carboxylate species.

The chromic carboxylate complex useful in the practice of the present invention includes at least one or more electropositive chromium III species and one or more electronegative carboxylate species. The complex may advantageously also contain one or more electronegative hydroxide and/or oxygen species. It is believed that, when two or more chromium III species are present in the complex, the oxygen or hydroxide species may help to bridge the chromium III species. Each complex optionally contains additional species which are not essential to the polymer crosslinking function of the complex. For example, inorganic mono- and/or divalent ions, which function merely to balance the electrical charge of the complex, or one or more water molecules may be associated with each complex. Non-limiting representative formulae of such complexes include:

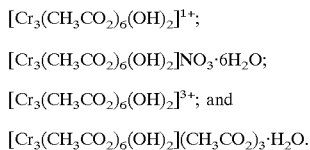

$[Cr_3(CH_3CO_2)_6(OH)_2]^{1+}$;

$[Cr_3(CH_3CO_2)_6(OH)_2]NO_3 \cdot 6H_2O$;

$[Cr_3(CH_3CO_2)_6(OH)_2]^{3+}$; and $[Cr_3(CH_3CO_2)_6(OH)_2](CH_3CO_2)_3 \cdot H_2O$.

"Trivalent chromium" and "chromic ion" are equivalent terms encompassed by the term "chromium III" species as used herein.

The carboxylate species are advantageously derived from water-soluble salts of carboxylic acids, especially low molecular weight mono-basic acids. Carboxylate species derived from salts of formic, acetic, propionic, and lactic acid, substituted derivatives thereof and mixtures thereof are preferred. The preferred carboxylate species include the following water-soluble species: formate, acetate, propionate, lactate, substituted derivatives thereof, and mixtures thereof. Acetate is the most preferred carboxylate species. Examples of optional inorganic ions include sodium, sulfate, nitrate and chloride ions.

A host of complexes of the type described above and their method of preparation are well known in the leather tanning art. These complexes are described in Shuttleworth and Russel, Journal of the Society of Leather Trades' Chemists, "The Kinetics of Chrome Tannage Part I.," United Kingdom, 1965, v. 49, p. 133–154; "Part III.," United Kingdom, 1965, v. 49, p. 251–260; "Part IV.," United Kingdom, 1965, v. 49, p. 261–268; and Von Erdman, Das Leder, "Condensation of Mononuclear Chromium (III) Salts to Polynuclear Compounds," Eduard Roether Verlag, Darmstadt Germany, 1963, v. 14, p. 249; and incorporated herein by reference. Udy, Marvin J., Chromium. Volume 1: Chemistry of Chromium and its Compounds. Reinhold Publishing Corp., N.Y., 1956, pp. 229–233; and Cotton and Wilkinson, Advanced Inorganic Chemistry 3rd Ed., John Wiley and Sons, Inc., N.Y., 1972, pp. 836–839, further describe typical complexes which may be within the scope of the present invention and are incorporated herein by reference. The present invention is not limited to the specific complexes and mixtures thereof described in the references, but may include others satisfying the above-stated definition.

Salts of chromium and an inorganic monovalent anion, e.g., CrCl3, may also be combined with the crosslinking agent complex to accelerate gelation of the polymer solution, as described in U.S. Pat. No. 4,723,605 to Sydansk, which is incorporated herein by reference.

The molar ratio of carboxylate species to chromium III in the chromic carboxylate complexes used in the process of the present invention is typically in the range of 1:1 to 3.9:1. The preferred ratio is range of 2:1 to 3.9:1 and the most preferred ratio is 2.5:1 to 3.5:1.

The additive of the present invention may comprise fibers or comminuted particles of plant materials, and preferably comprises comminuted particles of one or more plant materials.

Fibers suitable for use in the present invention are selected from among hydrophilic and hydrophobic fibers. Incorporation of hydrophobic fibers will require use of a suitable wetting agent. Preferably, the fibers utilized in the present invention comprise hydrophilic fibers, most preferably both hydrophilic and hydrophobic fibers.

With respect to any particular fiber employed in the practice of the present invention, it is believed that the longer the fiber, the more difficult it is to be mixed uniformly in solution. It is believed that fibers as long as 12,500 microns may tend to aggregate and form clumps. The shorter the fiber, it is believed the easier it is to mix in solution. On the other hand, the shorter the fiber, the greater the quantity necessary to provide the desired level of strength in a reinforced mature gel. In general, the fibers utilized in the present invention will have a length in the range of 100 microns to 3200 microns, preferable 100 microns to 1000 microns.

Non-limiting examples of suitable hydrophobic fibers include nylon, rayon, hydrocarbon fibers and mixtures thereof.

Non-limiting examples of suitable hydrophilic fibers include glass, cellulose, carbon, silicon, graphite, calcined petroleum coke, cotton fibers, and mixtures thereof.

Non-limiting examples of comminuted particles of plant materials suitable for use in the present invention include any derived from: nut and seed s hells or hulls such as those of peanut, almond, brazil, cocoa bean, coconut, cotton, flax, grass, linseed, maize, millet, oat, peach, peanut, rice, rye, soybean, sunflower, walnut, wheat; various portions of rice including the rice tips, rice straw and rice bran; crude pectate pulp; peat moss fibers; flax; cotton; cotton linters; wool; sugar cane; paper; bagasse; bamboo; corn stalks; various tree portions including sawdust, wood or bark; straw; cork; dehydrated vegetable matter (suitably dehydrated carbonhydrates such as citrus pulp, oatmeal, tapioca, rice grains, potatoes, carrots, beets, and various grain sorghams) whole ground corn cobs; or various plant portions the corn cob light density pith core, the corn cob ground woody ring portion, the corn cob coarse or fine chaff portion, cotton seed stems, flax stems, wheat stems, sunflower seed stems, soybean stems, maize stems, rye grass stems, millet stems, and various mixtures of these materials.

Optionally a dispersant for the comminuted plant material in the range of about 1 to about 20 pounds, preferably in the range of about 5 to about 10 pounds, and more preferably in the range of about 7 to about 8 pounds of dispersant may be utilized per pound of comminuted plant material. A non-limiting example of a dispersant would be NaCl.

Preferred comminuted materials useful in the practice of the present invention include those derived from peanuts, wood, paper any portion of rice seed or plant, and any portion of corn cobs.

These various materials can be comminuted to very fine particle sizes by drying the products and using hammer mills, cutter heads, air control mills or other comminution methods as is well known to those of skill in the comminution art. Air classification equipment or other means can be used for separation of desired ranges of particle sizes using techniques well-known in the comminution art.

Any suitable size of comminuted material may be utilized in the present invention, along as such size produces results which are desired. Of course, the particle size will be a function of diameter of the porosity passages. While the present invention will find utility for passages on the order of microns in diameter, it will also find utility on larger passages, for example, those with diameters greater than 1/64, 1/16 or event 1/8 of an inch.

In most instances, the size range of the comminuted materials utilized herein will range from below about 8 mesh ("mesh" as used herein refers to standard U.S. mesh), preferably from about −65 mesh to about −100 mesh, and more preferably from about −65 mesh to about −85 mesh. Specifically preferred particle sizes for some materials are provided below.

Preferred mixtures of comminuted materials useful in the practice of the present invention include a rice fraction and peanut hulls; a rice fraction and wood fiber and/or almond hulls; a rice fraction and a corn cob fraction, preferably a chaff portion; and a corn cob fraction, preferably a pith or chaff portion, a rice fraction, and at least one of wood fiber, nut shells, paper and shredded cellophane.

Rice is commercially available in the form of rice hulls, rice tips, rice straw and rice bran, as these various parts of the rice plant are separated commercially and are widely available from rice mills. Preferably, the size range of the rice fraction utilized herein will range from below about 8 mesh ("mesh" as used herein refers to standard U.S. mesh), preferably from about −65 mesh to about −100 mesh, and more preferably from about −65 mesh to about −85 mesh.

After the corn kernals are removed, corn cobs consist of four principle parts that are arranged concentrically. The central portion is a very light density pith core, that is surrounded by a woody ring, that in turn is surrounded by a coarse chaff portion, that in turn is covered by a fine chaff portion. The coarse and fine chaff portions form the sockets for ancoring the corn kernels to the corncob. The normal methods of grinding corncobs produce a mixture of all four parts enumerated above. It is possible, however, to separate the woody ring material from the remainder of the cob. The chaff portion of the corncob remaining after removal of the woody ring material is known as "bees wings". In the present invention, any of the pith or chaff portions("BPC") are the preferred portions of the corn cob, with the chaff portions being more preferred. A range of particle sizes of pith and chaff can be obtained from comminution, but the size range smaller than about 8 mesh is suitable for this invention. Preferably, a particle size distribution ranging from smaller than 8 mesh to smaller than 100 mesh is utilized.

Preferred woods for use as comminuted materials in the present invention include any type of hard wood fiber, including cedar fiber, oak fiber, pecan fiber and elm fiber. Preferably the wood fiber comprises cedar fibers.

Preferred nut shells for use in the present invention include pecan, walnut, and almond. Preferably, the nut shells comprise at least one of pecan or walnut shells.

Preferred particle sizes for the wood fibers, nut shells, paper and cellophane will generally range from about +10 mesh to −100 mesh. An illustration of a non-limiting particle size distribution for these materials would include particles of +10 mesh, +20 mesh, +30 mesh, +50 mesh, +60 mesh, +100 mesh, and −100 mesh.

For one of the preferred comminuted plant mixtures comprising a corn cob fraction, a rice fraction, and at least one of wood fiber, nut shells, paper and shredded cellophane, the mixture will generally comprise in the range of about 5 to about 95 weight percent rice, in the range of about 5 to about 95 weight percent corncob pith or chaff, with the total of ground wood fiber, ground nut shells, ground paper and shredded cellophane comprising in the range of about 5 to about 95 weight percent (weight percent based on the total weight of plant material in the mixture. Preferred ranges are about 20 to about 75 weight percent rice, about 5 to about 35 weight percent corncob pith or chaff, with the total of ground wood fiber, ground nut shells, ground paper and shredded cellophane comprising in the range of about 20 to about 75 weight percent. More preferred ranges are about 30 to about 50 weight percent rice, about 10 to about 30 weight percent corncob pith and chaff, with the total of ground wood fiber, ground nut shells, ground paper and shredded cellophane comprising in the range of about 25 to about 50 weight percent.

As these comminuted materials are to be added to a water base conformance fluid, a small amount of oil may optionally added to the mixture. This optional oil is preferably added while the plant materials are being mixed together. This mixing may take place in a ribbon blender, where the oil in the required amount is applied by a spray bar. The oil wets the particles and adds to their lubricity while at the same time helping to control dust produced by the mixing operation. A variety of oils may be utilized in the practice of the present invention in concentrations generally ranging from about 1 percent to about 5 percent by weight based on the total weight of the mixture of comminuted materials, more preferably ranging from about 1 percent to about 2 percent. A non-limiting example of a commercially available oil suitable for use in the present invention includes ISOPAR V, available from Exxon Corporation.

The various components of the present invention may be mixed in any suitable order utilizing mixing techniques as known to those in the art, including dry mixing of the various components prior to addition to water, or alternatively, either or both of the polymer and cross-linking agent may be utilized as a solution. Most preferably, the various components are mixed in dry form, and then contacted with water or aqueous solution to form a conformance fluid. This conformance fluid is then injected into the well as is known in the art.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

I claim:

1. A conformance additive comprising a dry mixture of water soluble crosslinkable polymer, a crosslinking agent, and a reinforcing material selected from among fibers and comminuted plant materials.

2. The additive of claim 1 wherein the polymer is an a carboxylate-containing polymer and the crosslinking agent is a chromic carboxylate complex.

3. The additive of claim 2 wherein the reinforcing material comprises hydrophilic and hydrophobic fibers.

4. The additive of claim 3 wherein the hydrophobic fibers comprise at least one selected from the group of hydrophobic fibers consisting of nylon, rayon, and hydrocarbon fibers, and wherein the hydrophilic fibers comprise at least one selected from the group of hydrophilic fibers consisting essentially of glass, cellulose, carbon, silicon, graphite, calcined petroleum coke, and cotton fibers.

5. The additive of claim 2 wherein the reinforcing material comprises comminuted plant material.

6. The additive of claim 5 wherein the reinforcing material comprises at least one comminuted material selected from the group of comminuted plant materials consisting of nut and seed shells or hulls of almond, brazil, cocoa bean, coconut, cotton, flax, grass, linseed, maize, millet, oat, peach, peanut, rice, rye, soybean, sunflower, walnut, and wheat; rice tips; rice straw; rice bran; crude pectate pulp; peat moss fibers; flax; cotton; cotton linters; wool; sugar cane; paper; bagasse; bamboo; corn stalks; sawdust; wood; bark; straw; cork; dehydrated vegetable matter; whole ground corn cobs; corn cob light density pith core; corn cob ground woody ring portion; corn cob chaff portion; cotton seed stems; flax stems; wheat stems; sunflower seed stems; soybean stems; maize stems; rye grass stems; millet stems; and mixtures thereof.

7. The additive of claim 2 wherein the polymer is a partially hydrolyzed polyacrylamide.

8. The additive of claim 7 wherein the reinforcing material is a comminuted material selected from among comminuted materials derived from peanuts, wood, paper any portion of rice seed or plant, any portion of corn cobs, and mixtures thereof.

9. The additive of claim 8 wherein the additive further includes cellophane, and wherein the reinforcing material is a comminuted material selected from among mixtures of comminuted rice fraction and peanut hulls; mixtures of comminuted rice fraction, and wood fiber or almond hulls; mixtures of comminuted rice fraction and corn cob fraction; and mixtures of comminuted rice fraction and corn cob fraction and at least one of wood fiber, nut shells, and paper.

10. The additive of claim 9 wherein the reinforcing material comprises comminuted mixture of rice fraction, corn cob pith and chaff, cedar fiber, nut shells, and paper.

11. A method of forming a conformance fluid comprising:
(a) providing a conformance additive comprising a dry mixture of water soluble crosslinkable polymer, a crosslinking agent, and a reinforcing material selected from among fibers and comminuted plant materials; and
(b) contacting the conformance additive with water or an aqueous solution to form the conformance fluid.

12. The method of claim 11 wherein the polymer is a partially hydrolyzed polyacrylamide, the crosslinking agent is a chromic carboxylate complex, wherein the additive further includes cellophane, and wherein the reinforcing material is a comminuted material selected from among mixtures of comminuted rice fraction and peanut hulls; mixtures of comminuted rice fraction, and wood fiber or almond hulls; mixtures of comminuted rice fraction and corn cob fraction; and mixtures of comminuted rice fraction and corn cob fraction and at least one of wood fiber, nut shells, and paper.

13. The additive of claim 12 wherein the reinforcing material comprises comminuted mixture of rice fraction, corn cob pith and chaff, cedar fiber, nut shells, and paper.

* * * * *